United States Patent [19]

Reichel et al.

[11] 3,853,561

[45] Dec. 10, 1974

[54] PROCESS FOR THE PREPARATION OF SCREEN PRINTING STENCILS USING INTERMEDIATE SUPPORT FOR LIGHT SENSITIVE LAYER

[75] Inventors: Maximilian Karl Reichel, Wiesbaden-Biebrich; Hans Ruckert, Wiesbaden-Schierstein; Walter Urban, Wiesbaden, all of Germany

[73] Assignee: Hoechst Aktiengesellschaft, Frankfurt Main, Germany

[22] Filed: Aug. 29, 1973

[21] Appl. No.: 393,233

Related U.S. Application Data

[63] Continuation of Ser. No. 201,539, Nov. 23, 1971, abandoned.

[30] Foreign Application Priority Data

Nov. 26, 1970 Germany .......................... 2058178

[52] U.S. Cl. .................. 96/36.4, 96/35.1, 96/36.75, 101/128.3

[51] Int. Cl. .............................................. G03f 7/12

[58] Field of Search ............... 96/91 R, 75, 36.4, 36, 96/115 R, 35.1; 101/128.3

[56] References Cited

UNITED STATES PATENTS

| | | | |
|---|---|---|---|
| 3,143,417 | 8/1964 | Reichel et al. | 96/36.4 |
| 3,189,451 | 6/1965 | Reichel | 96/36.4 |
| 3,245,792 | 4/1966 | Reichel et al. | 96/36.4 |
| 3,246,986 | 4/1966 | Borchers | 96/36.4 |
| 3,322,541 | 5/1967 | Reichel | 96/36.4 |
| 3,390,993 | 7/1968 | Borchers | 96/36.4 |
| 3,507,651 | 4/1970 | Wrench | 96/36.4 |

OTHER PUBLICATIONS

C. P. I., Basic Abstracts Journal, Derwent Publ. Ltd., Vol. E, Week R46, 2/6/1971, Abs. No. 336, (Belg. Pat. No. 750,691, 11/20/70, aquinto, U.S. App. Ser. No. 820,29G.

Kosar, J., "Light-Sensitive Systems," Wiley and Sons, 1965, p. 112–114.

*Primary Examiner*—Charles L. Bowers, Jr.
*Attorney, Agent, or Firm*—James E. Bryan

[57] ABSTRACT

This invention relates to a process for the preparation of screen printing stencils with the aid of an intermediate support for the copying layer, which comprises providing a sheet-like intermediate support with a layer comprising at least one binder and at least one diazonium salt of the general formula

I

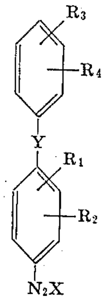

wherein $R_1$, $R_2$, $R_3$, and $R_4$ are selected from the group consisting of hydrogen atoms, halogen atoms, alkyl groups with 1 or 2 carbon atoms, or alkoxy groups with 1 to 4 carbon atoms, Y is selected from the group consisting of a single bond, or one of the groups —O—, —S—, —NH—, or —CONH—, and X is the anion of the diazonium salt, or a diazo amino compound derived from such diazonium salt; pressing the layer side of the light-sensitive material thus produced upon a screen printing support which before or after contact with the light-sensitive layer is moistened with a solution of at least one aldehyde or at least one compound containing at least one substituent of the formula $$—CH_{3-n}Z_n$$

wherein

Z is selected from the group consisting of a halogen atom, a hydroxy group, or an etherified, esterified, or acetalized hydroxy group with 1 to 4 carbon atoms in the alkyl, acyl or acetal radical, and $n$ is an integer from 1 to 3, and wherein Z is a halogen atom, when n is greater than 1; and drying, exposing, and developing the material, with the intermediate support being stripped from the light-sensitive layer before development.

11 Claims, No Drawings

PROCESS FOR THE PREPARATION OF SCREEN PRINTING STENCILS USING INTERMEDIATE SUPPORT FOR LIGHT SENSITIVE LAYER

This is a continuation of application Ser. No. 201,539, filed Nov. 23, 1971.

The present invention relates to a process for the preparation of stencils for screen printing in which an intermediate support for the copying layer is used.

In the screen printing art, there are two different processes for the preparation of the screen printing stencil, viz., the direct process and the indirect process. In the direct process, the light-sensitive copying layer is produced directly on the screen printing fabric, by applying a solution or dispersion to the fabric. Since light-sensitive pre-coated screen printing fabrics have only a limited shelf-life as a rule, coating is normally performed shortly before use, i.e., the consumer prepares the coating solution by mixing two components which are storable when separated, viz. the screen printing emulsion and the sensitizer solution. Owing to the manual method of operation, this coating process results in various inaccuracies. Further, in directly produced screen printing stencils, the printed lines do not always exactly correspond to the original used, because the light-sensitive layer is embedded between the meshes of the fabric and often shrinks somewhat after development.

When the screen printing stencil is indirectly produced by a photomechanical process, such as described, e.g., in U.S. Pat. No. 3,245,792, the copy of the original is produced not on the fabric carrying the copying layer and clamped in a printing frame, but on an intermediate support which carries a light-sensitive colloid layer and may be, e.g., of pigment paper or a transparent plastic film.

After exposure, the intermediate support is placed on a temporary base, which may be a glass plate of a film and the unexposed areas of the light-sensitive layer are removed by washing with water, and finally the hardened colloid image is transferred to the screen printing fabric.

The indirect method has the essential advantage that the sharpness of the edges of the tanned image areas is not dependent upon the size of the meshes of the fabric. The tanned layer is disposed on the fabric of the stencil, so that it is also possible for the openings of the meshes to be partially covered. In this manner, very sharp printing stencils are obtained, such as are required for printing very fine print and line or half-tone copies. So far, the fact that the indirect process is more complicated and the original is not always reproduced true to size, owing to the wet transfer of the developed layer, have prevented a wider application of this method. Further, this method also has the disadvantage that the presensitized material, i.e., the coated pigment paper or the coated film, cannot be stored for a longer period of time, because, here too, the layer contains all the components required for hardening the image.

Further, from U.S. Pats. Nos. 3,189,451 and 3,322,541, screen printing materials prepared by the direct process are known in which the light-sensitive layer contains a hardenable binder, a light-sensitive aromatic diazonium compound which is capable of condensation, or a diazo amino compound derived from such diazonium compound, and an aldehyde, preferably formaldehyde. And, finally, it has been proposed in copending application Ser. No. 200829 filed Nov. 22, 1971 now abandoned to replace the aldehyde by certain formaldehyde substitutes, preferably N-methylol-compounds and C-methylol-compounds.

The present invention provides a new process for the preparation of screen printing stencils by which the disadvantages of the prior art are avoided.

The present invention is concerned with a process for the preparation of screen printing stencils with the aid of an intermediate support for the copying layer, in which process a sheet-like intermediate support is provided with a layer which contains, as the essential components, at least one binder and at least one diazonium salt of the general formula

I

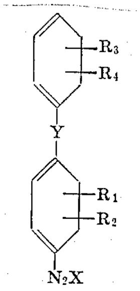

wherein $R_1$, $R_2$, $R_3$, and $R_4$ are the same or different, and may be hydrogen atoms, halogen atoms, alkyl groups with 1 or 2 carbon atoms, or alkoxy groups with 1 to 4 carbon atoms, Y is either a single bond, or one of the groups —O—, —S—, —NH—, or —CONH—, and X is the anion of the diazonium salt, or a diazo amino compound derived from such diazonium salt.

The light-sensitive material thus produced is pressed with its layer side upon a screen printing support which, before or after contact with the light-sensitive layer, is moistened with a solution of at least one aldehyde or at least one compound containing at least one substituent of the formula $$—CH_{3}\text{-}nZ_n$$

wherein

Z is a halogen atom, a hydroxy group, or an etherified, esterified, or acetalized hydroxy group with 1 to 4 carbon atoms in the alkyl, acyl or acetal radical, and $n$ is an integer from 1 to 3, and wherein Z is a halogen atom, when $n$ is greater than 1.

The material is then dried, exposed and developed in the normal manner, with the intermediate support being peeled off from the light-sensitive layer before development.

The process according to the present invention has substantially all the advantages of the above described indirect method, and in addition thereto allows a prolonged storage of the layer on the intermediate support, because the component having the cross-linking effect, which is necessary for hardening the layer, is not incorporated in the layer before it is transferred to the screen printing fabric. Further, the process of the invention guarantees a dimensionally accurate reproduction of the original, because the layer is exposed only after it has been transferred to the screen printing support.

In the process of the invention, opaque as well as transparent materials may be used as intermediate supports for the copying layer. Examples of suitable materials are: papers provided with a surface finish which facilitates the removal of the layer, e.g., pigment paper and the like, and transparent or opaque plastic films, e.g., films of cellulose acetate, polyester, polycarbonate, polyvinyl chloride, polyamide and the like. Of course, when the screen printing material is to be exposed through the intermediate support before the support is peeled off, the support must be transparent, However, preference is given to the method by which the material is exposed after the support has been removed, because by this method sharper copies are normally produced.

Generally, the light-sensitive layer has a thickness from about 15 to about 50$\mu$, preferably between 20 and 30$\mu$.

In addition to the benzene nucleus carrying the diazonium group, the diazonium salts used in the light-sensitive layer according to the invention contain a further benzene nucleus where the condensation reaction with formaldehyde of the formaldehyde substitute may take place. As mentioned above, the two benzene nuclei of the diazonium compounds are connected either by a single bond, or by one of the groups —NH—, —O—, —S—, or —CONH—. Compounds containing an —NH— group, i.e., 4-diazo diphenylamine and its derivatives, are particularly active and therefore preferred. All diazonium compounds to be used according to the invention may carry substituents in both benzene nuclei, especially alkoxy groups with 1 to 4 carbon atoms, preferably methoxy or ethoxy groups, alkyl groups with 1 or 2 carbon atoms, halogen atoms, preferably chlorine or bromine, and the like.

The following are examples of suitable diazonium compounds: 2, 3′, 5-trimethoxy-diphenyl-4-diazonium chloride, 2, 4′, 5-triethoxydiphenyl-4-diazonium chloride, 4-phenylmercapto-2-chloro-5-methoxy-benzene diazonium chloride, 4-[4-(3-methylphenoxy)- phenoxy]-2,5-dimethoxy-benzene diazonium sulfate, 4-(4-methoxy-phenylmercapto)-2,5-diethoxy-benzene diazonium chloride, 2,5-diethoxy-4-phenoxy-benzene diazonium chloride, 4-(3,5-dimethoxy-benzolamino)-2,5-diethoxy-benzene diazonium hexafluophosphate, diphenylamine-4-diazonium sulfate, and the 4-diazonium salts of the following diphenylamine derivatives:

3-methoxy-diphenylamine, 2-methoxy-diphenylamine, 2′-methoxy-diphenylamine, 4′-methoxy-diphenylamine, 3-methyl-diphenylamine, 3-ethyl-diphenylamine, 4′-methyl-diphenylamine, 3-ethoxy-diphenylamine, 3-butoxy-diphenylamine, 3-$\beta$-hydroxy-ethoxy-diphenylamine, 2′-methoxy-5′-methyl-diphenylamine, 3-methoxy-6-methyl-diphenylamine, 3′-chloro-diphenylamine, 4′-n-butoxy-diphenylamine, 3,4′-dimethoxy-diphenylamine, and 4′-bromo-diphenylamine.

The diphenylamine-4-diazonium salts and 3-methyl-diphenylamine-4-diazonium salts, in particular the 3-alkoxy-diphenylamine-4-diazonium salts with 1 to 3 carbon atoms in the alkoxy group, are preferred, above all the 3-methoxy-diphenylamine-4-diazonium salt.

Further, small quantities of such light-sensitive substances may be added to the light-sensitive layer which during exposure exert a tanning action upon the binder, even without the addition of a hardener. Particularly useful for this purpose are the known condensation products of diazo-diphenylamines and formaldehyde, and, preferably, the diazo mixed condensates described in copending applications Ser. Nos. 826,297 and 826,296 both filed May 20, 1969 with application Ser. No. 826,296 being now abandoned. By such additives, the light-sensitivity of the reproduction layers may be further increased; however, they should not substantially exceed a proportion of 20 per cent by weight of the uncondensed diazonium salt, lest the shelf-life of the pre-coated materials be impaired.

Numerous binders may be used in the preparation of the transferable light-sensitive layer; it is not absolutely necessary for them to be water-soluble; in many cases it is sufficient when they are capable of swelling in water, which is preferred as the developing liquid. A development with water or aqueous developers, which is preferred for screen printing, is possible when using, e.g.: polyvinyl alcohol, partially acetylated polyvinyl alcohol or partially hydrolyzed polyvinyl acetate polyacrylic acid, methyl cellulose, hydroxyethyl cellulose, gelatin, casein, or other natural colloids. Polyvinyl alcohol is preferred, and incompletely saponified polyvinyl acetates are most advantageous. It is possible and often advantageous to add plasticizers, such as tricresyl phosphate or dibutyl phthalate, anti-foaming agents, such as silicone oils or polyglycols, preserving agents, such as sorbic acid, or dyes and wetting agents to the compositions.

Up to a certain degree — which is determined by the developability of the layer with aqueous developers — binders which are insoluble or sparingly soluble in water may be added to the layer, either dissolved or superficially swollen in a solvent, or in the form of a dispersion. Suitable additives are fillers such as kieselguhr or aluminum oxide, and synthetic materials, such as polyamides or phenol resins and vinyl polymers, such as polyvinyl acetate, polystyrene, or polyvinylidene chloride. Polyvinyl acetate in the form of an aqueous dispersion is preferred, and dispersions which have been internally plasticized by copolymerization and thus render it unnecessary to add plasticizers, are particularly advantageous.

By the process of the invention, screen printing stencils are obtained which may be used for printing with solvent inks and also with aqueous inks, e.g., for textile printing. The process according to the invention may be employed with particular advantage for the preparation of stencils used for screen printing with solvent-containing inks.

The light-sensitive material produced as described above is not capable of being tanned by light-action in this form. Therefore, it can be stored for extremely long periods of time even under unfavorable conditions, without losing its efficiency when it is subsequently used according to the invention.

For further processing of the material, the screen printing support clamped in a frame is moistened with a solution of the cross-linking agent, and the light-sensitive material is then pressed with its layer side upon the screen printing fabric. Moistening may take place either before or after the layer is pressed upon the fabric. It is even possible to soak the light-sensitive layer itself with the hardener solution before it is placed upon the fabric, provided that the hardener solution does not attack the layer, e.g., when the solution consists substantially of organic solvents. However, this method of operation is not preferred normally, because it is more advantageous to use aqueous hardener solutions. The term "aqueous solutions" as used in this context means that either water alone or water mixed with a smaller proportion of a water-miscible organic solvent is used as solvent. The latter solvents are added especially when the cross-linking agent is not sufficiently soluble in water alone.

The combination of materials thus produced is dried, most advantateously while slightly heating, and the intermediate support is then peeled off from the light-sensitive layer. The resulting screen printing material is then exposed in known manner and developed to form a screen printing stencil.

As the cross-linking substance, the hardener solution may contain an aldehyde as described in U.S. Pat. No. 3,189,451, e.g., formaldehyde, acetaldehyde, propionaldehyde, chloroacetaldehyde, glyoxal, glutaric dialdehyde, isobutyraldehyde, crotonic aldehyde, cinnamic aldehyde, salicylic, aldehyde, stilbene aldehyde, terephthalic dialdehyde, furfurol, pyridine-4-aldehyde, and others. Of these, formaldehyde is by far the most advantageous.

Further the formaldehyde substitutes described in copending application Ser. No. 200829 filed Nov. 22, 1971, which contain no free aldehyde groups, may be used as cross-linking substances. They include not only the methylol compounds which are prepared by reacting reactive compounds with formaldehyde and which may be in a chemical equilibrium with their starting materials. Their derivatives, such as their ethers, esters, acetals and semi-acetals, which may be prepared by methods other than by condensation with formaldehyde and corresponding reaction of the methylol compounds, are also suitable. Further, the halogen methyl compounds derived from the methylol compounds by replacement of the hydroxy group by a halogen atom, also may be used. In the case of polyfunctional cross-linkable compounds, the effect is relatively stronger, or can be achieved by using smaller quantities.

It is also possible for two different groups having the inventive effect to be present in one molecule, as in the case of N-methylol-chloro-acetamide, for example. When the chloromethyl group is further halogenated, as in the case of N-methylol-dichloro-acetamide and N-methylol-trichloro-acetamide, the tanning action caused by exposure to light diminishes.

The methylol compounds or their derivatives may also contain one or more groups which by themselves are light-sensitive, such as the azido group, or which are capable of polymerization, such as the acrylic group (or which are polymerized, such as the polyacrylic derivatives), or which are hardenable, such as the epoxy group, or are capable of a reversible transverse cross-linking, such as the disulfide group.

More in detail, the formaldehyde substitutes may belong to the following class of substances:

I. Acid Amide N-Methylol Compounds
II. C-Methylol Compounds
III. Acetals
IV. Derivatives of Methylol Compounds I. N-Methylol Compounds of Primary Carboxylic Amides monomethylol urea,
dimethylol urea,
N-methylol-acetamide,
N-methylol-propionic amide,
N-methylol-chloroacetamide,
N-methylol-dichloroacetamide,
N-methylol-trichloro-acetamide,
N,N'-dimethylol-oxamide,
N,N'-dimethylol-malonic amide,
N,N'-dimethylol-succinic amide,
trimethylol-citramide,
dimethylol-sebacic diamide,
N-methylol-acrylamide, and
N-methylol-polyacrylamide.

N-Methylol Compounds of Secondary Acid Amides dimethylol-ethylene urea,
dimethylol dihydroxy ethylene urea,
dimethylol propylene urea,
trimethylol melamine,
tetramethylol melamine,
pentamethylol melamine,
1,3-dimethylol-5-methyl-1,3,5-triazinone-2,
1,3-dimethylol-5-allyl-1,3,5-triazinone-2,
1,2-di-[1,3-dimethylol-1,3,5-triazinone-(2)-5-yl]-ethane,
N-methylol-N-methyl-acetamide,
N-methylol-acetanilide,
N-methylol-phtalimide,
N-methylol-pyrrolidone,
tetramethylol-hydrazo-dicarboxylic amide, and
tetramethylol-acetylene-diurea.

N-Methylol Compounds Derived from Primary Acid Amides of Aromatic Carboxylic Acids and Sulfonic Acids N-methylol-benzamide,
N-methylol-salicylamide,
N-methylol-2-cyano-benzamide,
N-methylol-cinnamic amide,
N-methylol-nicotinic amide,
N,N'-dimethylol-terephthalic diamide,
N-methylol-4-azido-benzamide (melting point 160°–161°C),
N-methylol-4-azido-cinnamic amide,
N-methylol-toluene-sulfonic amide,
N,N'-dimethylol-benzene-m-disulfonic amide,
N-methylol-(4-azido-benzene-sulfonyl)-urea.

II. C-Methylol Compounds glycolic acid,
glycolic amide,
dihydroxy-acetone,
anhydro-enneoheptose,
2,4,6-trimethylol-phenol,
2,6-dimethylol-4-methyl-anisole,
2,6-dimethylol-p-cresol,
1,3-dihydroxymethyl-4,6-diisopropyl-benzene,
2,2-bis-(4-hydroxy-3,5-dihydroxymethyl-phenyl)-propane,
3,3'-dihydroxymethyl-4,4'-dihydroxy-diphenyl-sulfone, III. Acetals of Methylol Compounds 2,2,4,4-tetramethylol-pentanone-3-bis-formal,
2,2,4,4-tetramethylol-pentanol-3-bis-formal,
polyvinyl hydroxymethyl ether,
5-hydroxymethyl-1,3-dioxolane,
2-methyl-1,3-dioxolane, and
ascorbic acid diformal.

IV. Further Derivatives of Methylol Compounds

N-methylol-chloroacetamide,
chloracetamido-chloromethane,
methylene-bis-chloracetamide,
bis-chloracetyl-hydrazine,
bis-chloracetyl-ethylene-diamine, bis-chloracetyl-tetramethylene-diamine,
bis-chloracetyl-3,5-phenylenediamine-1-carboxylic acid,
benzamido-bromomethane,
N-(benzoxymethyl)-methacrylamide,
1,3,5-tri-β-chloropropionyl-hexahydro-1,3,5-triazine,
methylene-bis-β-chloropropionamide,
phthalimido-chloromethane,
β-chloropropionamide,
N-methylol-β-chloro-propionamide,
β-acetoxy-propionamide,
N-methylol-2,3-dibromo-propionamide
N-methylol-β-acetoxy-propionamide,
4,4'-dimethoxy-methyl-diphenylether,
4,4'-diacetoxymethyl-diphenylether,
N-acetoxymethyl-phenylacetamide,
trismethoxymethyl-diphenylether mixture
polymethacrylic amide-N-methylol methylether,
tetramethoxymethyl-acetylene-diurea,
tetramethoxymethyl-hydrazo-dicarboxylic amide,
glycidoxymethyl-melamine,
N,N'-dimethylol-dithio-dithio-diacetamide, and
tris-chloromethyl diphenylether mixture.

Among these compounds, the water-soluble substances are preferred, in particular the water-soluble N-methylol-amides derived from ureas and lower aliphatic carboxylic acids. N,N'-dimethylol-urea has proved to be particularly effective.

The concentration of the cross-linking substance in the hardener solution must be adapted to the solvent used and the layer to be impregnated with the solution. Normally, concentrations between about 3 and 10 per cent are employed. Aldehydes, especially formaldehyde, are preferably used in concentrations between 5 and 7 per cent, and methylol compounds, preferably N,N'-dimethylol-urea, are used in 3 to 7 per cent solutions.

In addition to the cross-linking substances, the hardener solutions may contain other additives, such as wetting agents.

In the following examples different embodiments of the process of the invention are described. Unless stated otherwise, percentages are by weight.

EXAMPLE 1

An aqueous dispersion containing 180 g of polyvinyl alcohol (2% of vinyl acetate units, K-value of 50), 60 g of dibutyl phthalate as a plasticizer, 90 g of finely dispersed polyvinyl acetate, and 15 g of diphenylamine-4-diazonium sulfate per liter of dispersion is applied, by means of a doctor knife, to a transparent polyethylene terephthalate film of a thickness of 100$\mu$ and briefly dried at an elevated temperature (80° to 90°C for machine-coating). When the material is used, it is placed, with its light-sensitive layer facing upward, under a polyamide or polyester fabric clamped in a screen printing frame, and the fabric is then wetted with a sponge soaked in a 5 per cent aqueous solution of dimethylol urea and pressed against the copying layer. After a short time, the material is dried at 40° to 50°C and then the supporting film is stripped from the copying layer, which remains on the fabric. The screen printing material thus obtained is exposed in a vacuum printing frame, using a positive transparent original, and then developed with running water and dried. A printing stencil is thus produced which is excellently suited for screen and textile printing and whose printing areas are completely free from tooth-like serrated edges, because the reproduction layer is deposited not in the fabric, but on one of the surfaces thereof. If, instead of a dimethylol urea solution, a 5 per cent formaldehyde solution is used, about equivalent results are obtained.

The copying material disposed on the intermediate support is distinguished by an excellent shelf-life. Even after a storage time of up to 12 months at room temperature, it could be processed into a screen printing stencil in the normal manner.

EXAMPLE 2

Instead of diphenylamine-4-diazonium sulfate, an equimolar quantity of 3-methyl-diphenylamine-4-diazonium sulfate is added to the aqueous dispersion described in Example 1. Dimethylol ethylene urea, in a 5 per cent aqueous solution, is used as the methylol compound effecting the tanning action.

EXAMPLE 3

In the aqueous dispersion mentioned in Example 1, the diphenylamine-4-diazonium sulfate is replaced by an equimolar quantity of 3-methoxy-diphenylamine-4-diazonium sulfate. A 5% solution of dimethylol-ethylene urea is employed as the methylol compound effecting the hardening action. After exposure under a transparent positive original and development with running water, a printing stencil is obtained which is excellently suitable for screen printing and textile printing. Instead of 3-methoxy-diphenylamine-4-diazonium salt, the equimolar quantity of 3-ethoxy-diphenylamine-4-diazonium salt may be used. Results of similar quality are obtained when using a 10% solution of 2,4,6-trimethylol-phenol as the hardener.

EXAMPLE 4

An aqueous dispersion containing 100 g of the polyvinyl alcohol used in Example 1, 60 g of dibutyl phthalate, 90 g of finely pulverized polyvinyl acetate, and 11 g of 2,5-dimethoxy-diphenylamine-4-diazonium sulfate per liter of dispersion is applied as described in Example 1 to a cellulose acetate film and dried. A 5% aqueous solution of dimethylol dihydroxy ethylene urea is used as the substance effecting the tanning action with which the nylon, Perlon or polyester fabric clamped in the printing frame is moistened. After a short stay in the drying cabinet, the intermediate support is peeled off from the copying layer which remains on the fabric, the layer is exposed in a vacuum printing frame under a transparent positive original, then developed with running water, and dried. A printing stencil is thus produced which is very well suited for screen and textile printing and whose printing areas are completely free from tooth-like serrated edges.

Similar results are obtained when dimethylol-dihydroxy ethylene urea is replaced by monomethylol urea. Further, it is possible to moisten the fabric and the layer with a solution of N-methylol-chloroacetamide.

EXAMPLE 5

Instead of diphenylamine-4-diazonium sulfate, an equimolar quantity of 2,5-diethoxy-diphenylamine-4-diazonium sulfate is added to the aqueous dispersion described in Example 1. Instead of dimethylolethylene urea, which effects the tanning action in Example 1, a corresponding quantity of dimethylol-propylene urea or tetramethoxy-methyl-acetylene-diurea may be used with equally good results. Printing forms are thus obtained which are very suitable for screen and textile printing.

For better inspection, the printing forms may be colored in the normal manner, by pouring a dyestuff upon them or by painting them with a water-soluble dyestuff, e.g., Methyl Violet. Excess dyestuff which is not absorbed by the exposed areas of the layer is rinsed off with water. Alternatively, the non-printing areas of the screen printing stencil may be colored by utilizing the coupling capability of the diazo compounds, which very seldom is completely destroyed by exposure. For this purpose, the developed stencil is simply treated with an alkaline solution of a coupling substance, such as those used in textile dyeing processes, rinsed after a short developing time, and dried.

EXAMPLE 6

An aqueous dispersion containing 100 g of hydroxy ethyl cellulose, 100 g of polyvinyl acetate, 60 g of tricresyl phosphate, and 15 g of 3-methoxy-diphenylamine-4-diazonium sulfate per liter of dispersion is applied to a 60 $\mu$ thick polyvinyl chloride film and dried at a temperature of 40° to 50°C. The storable light-sensitive material thus produced is placed with its layer side in contact with a polyester fabric uniformly moistened with a 5% solution of dimethylol urea, which is clamped in a screen printing frame, and is evenly pressed upon the fabric. After keeping the combined materials for 3 to 5 minutes at a temperature of 40° to 50°C, the intermediate support is peeled off from the layer, which remains on the fabric. The layer is then exposed in a screen printing frame under a positive transparent original, developed with running water, and finally dried. A printing form is thus obtained which is very well suited for screen and textile printing and whose printing areas are completely free from tooth-like serrated edges.

Instead of the polyvinyl chloride film, a film of cellulose acetate, nylon, Perlon, or polyethylene terephthalate may be used as a support with equally good results.

EXAMPLE 7

An aqueous dispersion containing 100 g of polyvinyl alcohol (12percent of vinyl acetate units, K-value of 70), 140 g of a vinyl acetate copolymer dispersion, 14 g of diphenylamine- 4-diazonium sulfate, and 3 g of the condensation product obtained from 32.3 parts by weight of 3-methoxy-diphenylamine- 4-diazonium sulfate and 25.8 parts by weight of 4,4'-bis-methoxy-methyl diphenylether, in the form of the chloride (see Example 57 of copending application Ser. No. 826,297, filed May 20, 1969) per liter of dispersion, is mechanically coated onto a 50 $\mu$ thick polyester film and gently dried. This storable screen printing material, which by itself is capable of a weak cross-linking action under the influence of light, is processed into a screen printing stencil as described in Example 1, using a 6% solution of N-methylol-acrylamide. The material is distinguished by an improved light-sensitivity.

It will be obvious to those skilled in the art that many modifications may be made within the scope of the present invention without departing from the spirit thereof, and the invention includes all such modifications.

What is claimed is:

1. A process for the preparation of screen printing stencils which comprises the following steps in the following order a. providing a sheet-like intermediate support with a layer comprising at least one cross-linkable binder capable of swelling in water or soluble in water and at least one condensable aromatic diazonium salt of the general formula

I

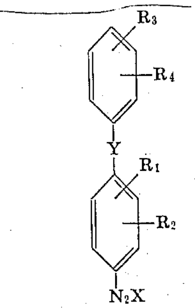

wherein $R_1$, $R_2$, $R_3$ and $R_4$ are the same or different and are selected from the group consisting of hydrogen, halogen, alkyl groups with 1 or 2 carbon atoms, and alkoxy groups with 1 to 4 carbon atoms, Y is selected from the group consisting of a single bond and the groups —O—, —S—, —NH—, and —CONH—, and X is the anion of the diazonium salt, or a diazo amino compound derived from said diazonium salt, b. drying said layer, c. pressing the layer side of the light-sensitive material thus produced upon a screen-printing support and moistening said light-sensitive layer, before or after pressing on said screen material, with a solution of at least one aldehyde or at least one compound of the general formula $$A(-CH_{3-n}Z_n)_m$$

wherein

A is a m-valent radical of a primary or secondary acid amide, the free valences being at the amide N atom, or of a phenol, Z is selected from the group consisting of a halogen atom or an OH group, $n$ is an integer from 1 to 3, and $m$ is an integer from 1 to 5 and wherein Z is a halogen atom when $n$ is greater than 1, d. drying the laminated element, e. imagewise exposing said light-sensitive layer under a master, and f. developing the exposed light-sensitive layer with water, wherein the unexposed areas of the layer are removed, said intermediate support being stripped from said light-sensitive layer before development.

2. A process according to claim 1, in which the intermediate support is stripped before the light-sensitive screen printing material is exposed.

3. A process according to claim 1 in which the screen printing support is moistened with an aqueous solution of formaldehyde.

4. A process according to claim 3, in which a 5 to 7 per cent formaldehyde solution is used.

5. A process according to claim 1 in which the screen printing support is moistened with an aqueous solution of an N-methylol acid amide.

6. A process according to claim 5 in which a 3 to 7 per cent solution of N,N'-dimethylol-urea is used.

7. A process according to claim 1 in which a diazonium salt corresponding to the general formula I is used in which Y is an —NH— group.

8. A process according to claim 1 in which the binder is a vinyl alcohol polymer.

9. A process according to claim 1 in which the binder is soluble in water.

10. A process according to claim 1 in which the light-sensitive layer is moistened by moistening the screen printing support before or after pressing said light-sensitive layer on said screen printing support.

11. A process according to claim 1 in which step (c) is performed with a solution of at least one compound of the general formula $$A(-CH_{3-n}Z_n)_m$$

in which A, Z, $m$ and $n$ are as stated in claim 1.

* * * * *